(12) United States Patent
Green

(10) Patent No.: US 10,760,737 B2
(45) Date of Patent: Sep. 1, 2020

(54) PUMP WITH ANGLED DRAIN SYSTEM

(71) Applicant: DIVERSITECH CORPORATION, Duluth, GA (US)

(72) Inventor: Matthew Christopher Green, Amherst, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 123 days.

(21) Appl. No.: 15/674,140

(22) Filed: Aug. 10, 2017

(65) Prior Publication Data

US 2018/0045368 A1     Feb. 15, 2018

Related U.S. Application Data

(60) Provisional application No. 62/373,150, filed on Aug. 10, 2016.

(51) Int. Cl.

| | |
|---|---|
| *F16N 31/00* | (2006.01) |
| *F04D 29/40* | (2006.01) |
| *F04B 53/04* | (2006.01) |
| *F04C 18/00* | (2006.01) |
| *F04D 29/063* | (2006.01) |
| *F16N 19/00* | (2006.01) |
| *F04D 25/06* | (2006.01) |
| *F04B 39/02* | (2006.01) |
| *F04B 39/12* | (2006.01) |

(Continued)

(52) U.S. Cl.
CPC .......... *F16N 31/00* (2013.01); *F04B 39/0284* (2013.01); *F04B 39/121* (2013.01); *F04B 53/04* (2013.01); *F04C 18/00* (2013.01); *F04D 25/06* (2013.01); *F04D 29/063* (2013.01); *F04D 29/403* (2013.01); *F16N 19/00* (2013.01); *F04B 17/03* (2013.01); *F04B 35/04* (2013.01); *F16N 19/003* (2013.01); *F16N 2031/008* (2013.01)

(58) Field of Classification Search
CPC ........ F16N 19/00; F16N 31/00; F16N 31/002; F16N 31/006; F16N 2031/008; F04B 39/0284; F04B 53/04; F01M 11/0408; F01M 2011/0416
See application file for complete search history.

(56) References Cited

U.S. PATENT DOCUMENTS 4,123,201 A * 10/1978 Andriulis ............ F04C 18/3441
                                                    417/204
4,676,265 A *  6/1987 Volk ........................ F04B 39/04
                                                    137/172

(Continued)

*Primary Examiner* — Minh Truong
(74) *Attorney, Agent, or Firm* — Dentons US LLP

(57) ABSTRACT

A pump, such as a vacuum pump, includes at least one housing and a motor and oil reservoir disposed within the housing. The pump housing can include a bottom exterior surface and one or more side and/or front exterior surfaces that extend generally up from the bottom exterior surface. An oil drain port can be positioned at or near the intersection of the bottom exterior surface and the side or front exterior surface. The housing can include an interior bottom surface that defines at least a portion of a drain passageway for the pump and can be fluidicly coupled to the oil reservoir. At least a portion of the interior bottom surface can be angled downward at an acute angle to the horizontal towards the oil drain port to improve the draining and replacement of oil in the pump.

16 Claims, 6 Drawing Sheets

(51) Int. Cl.
*F04B 35/04* (2006.01)
*F04B 17/03* (2006.01)

(56) References Cited

U.S. PATENT DOCUMENTS

| | | | | |
|---|---|---|---|---|
| 5,022,836 | A * | 6/1991 | Tokumitsu | F04C 27/009 |
| | | | | 418/104 |
| 5,156,532 | A * | 10/1992 | Arndt | F04C 29/005 |
| | | | | 277/563 |
| 5,209,653 | A * | 5/1993 | Murray | F04C 23/00 |
| | | | | 417/410.1 |
| 5,379,862 | A * | 1/1995 | Schmidt | F16N 31/002 |
| | | | | 141/98 |
| 6,702,160 | B1 * | 3/2004 | Griffith | B65D 1/06 |
| | | | | 222/481.5 |
| 8,690,001 | B1 * | 4/2014 | Liao | F16N 31/002 |
| | | | | 220/504 |
| 2001/0038795 | A1 * | 11/2001 | Nolan | F04B 39/0284 |
| | | | | 417/63 |
| 2016/0290191 | A1 * | 10/2016 | Staley | F01M 11/0408 |
| 2017/0051733 | A1 * | 2/2017 | Mistry | F04B 23/02 |
| 2017/0081008 | A1 * | 3/2017 | Hudson | B63H 21/386 |
| 2018/0073625 | A1 * | 3/2018 | Miyazono | B21D 53/24 |
| 2019/0032526 | A1 * | 1/2019 | Tilbury | F01M 11/0004 |

* cited by examiner

PUMP WITH ANGLED DRAIN SYSTEM

RELATED APPLICATIONS

This application claims priority under 35 U.S.C. § 119 to U.S. Provisional Patent Application No. 62/373,150 filed Aug. 10, 2016, and titled "Pump Housing with Angled Drain System," the entire contents of which are hereby incorporated herein by reference for all purposes.

TECHNICAL FIELD

Embodiments disclosed herein are generally related to pumps and pump housings and more particularly to a pump housing with an angled oil drain system.

BACKGROUND

Operators and technicians, referred to hereafter collectively as technicians, that conduct maintenance work on heating, ventilating, and air conditioning (HVAC) systems are typically supposed to change the oil in vacuum pump that they use with the servicing of the HVAC unit after each time they conduct maintenance work on a HVAC system. Unfortunately, this is not always the case. In some conventional pump systems, the oil drain port can be positioned along the rear and bottom of the pump, requiring the technician to lift the pump in order to remove the oil drain plug from the oil drain port. In other conventional pump systems, the oil drain port may be positioned along a front vertical face of the pump that has a flat horizontal bottom surface.

However, the positioning along the front vertical face of the pump results in the oil drain port not being at the lowest point of the sump in the pump. In this situation, technicians need to lift or otherwise prop up the rear portion of the pump to allow the oil to flow toward the front vertical face of the pump and the oil drain port in order for the oil to flow out of the pump. Even with this manual inclination, sediment that has collected in the sump may be difficult to remove because it is not located near the oil drain port and there may not be sufficient oil to carry or push the sediment towards the oil drain port. This results in a system that is fouled with sediment even after new oil is introduced into the pump. An easier, more efficient design for draining oil from the pump will increase the likelihood that oil replacement will occur at the frequency necessary and will result in a cleaner overall pump system.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXEMPLARY EMBODIMENTS

Figure 1:
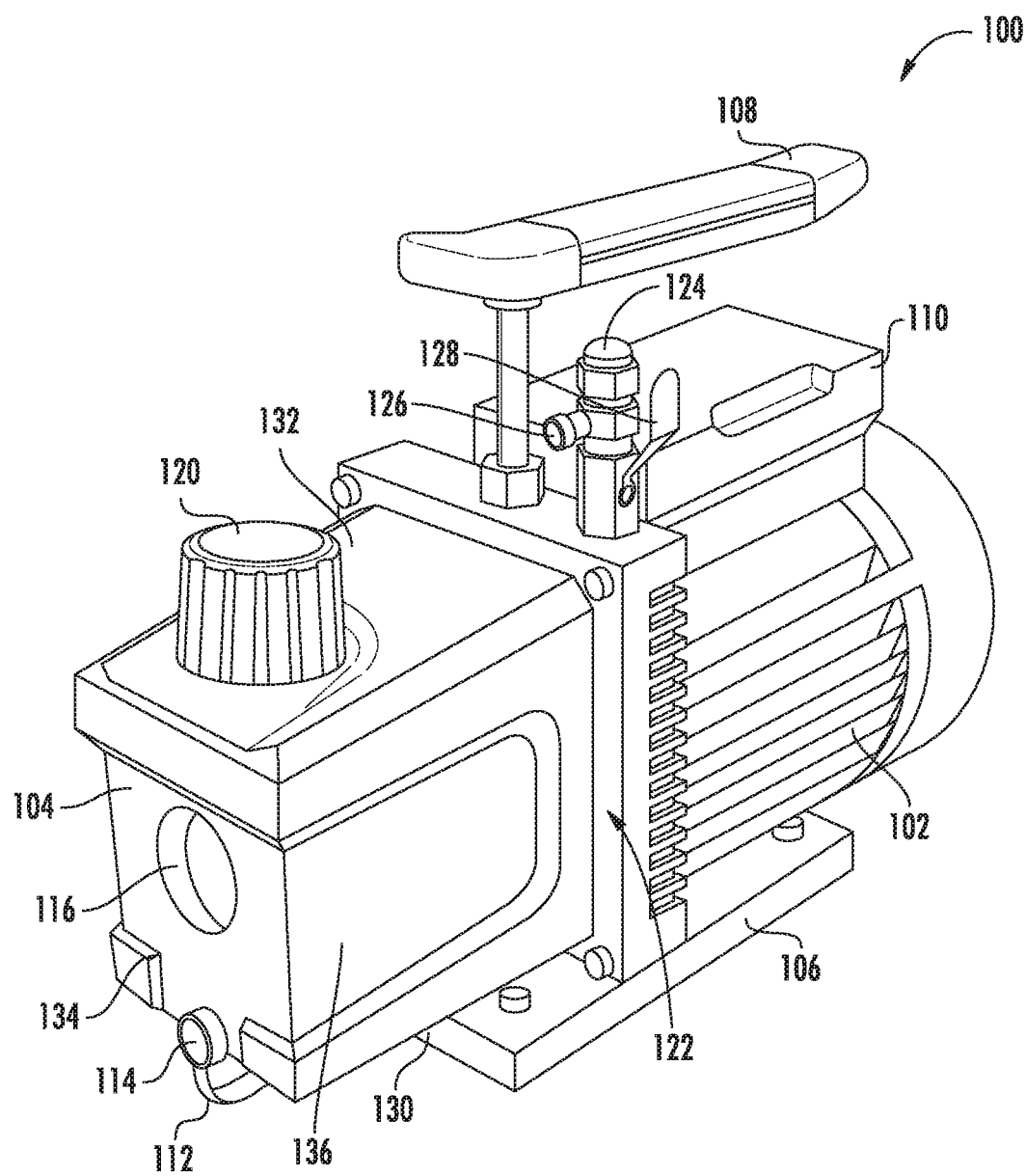
FIG. 1 is a perspective view of a vacuum pump in accordance with one example embodiment of the disclosure.

Example embodiments now will be described more fully hereinafter with reference to the accompanying drawings, in which exemplary embodiments are shown. This invention may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

Certain dimensions and features of the example vacuum pump are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical or other parameter indicates that the numerical or other parameter includes variations that, using mathematical and industrial principles accepted in the art (e.g., rounding, measurement or other systematic errors, manufacturing tolerances, etc.), would not vary the least significant digit.

In addition, certain dimensions and features of the vacuum pump are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" in connection with a numerical or other parameter indicates that the numerical or other parameter includes variations that, using mathematical and industrial principles accepted in the art (e.g., rounding, measurement or other systematic errors, manufacturing tolerances, etc.), would not vary the least significant digit. As used herein, the term "substantially parallel" indicates that the parallel relationship is not a strict relationship and does not exclude functionally similar variations thereof. As used herein, the term "substantially orthogonal" or "substantially perpendicular" indicates that the perpendicular relationship is not a strict relationship and does not exclude functionally similar variations thereof It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

FIGS. 1-3B are various views of a vacuum pump 100 and parts of the vacuum pump 100, in accordance with one example embodiment of the disclosure. While FIGS. 1-3B show and describe a vacuum pump 100, the disclosed concepts herein may be applied to any type of pump and should not be construed as being limited to a vacuum pump. Referring now to FIGS. 1-3B, the example vacuum pump 100 can include a pump housing 102 and a housing flange cover 104 positioned along a front end of the pump housing 102. The housing flange cover 104 can be removably coupled to the pump housing 102. For example, the housing flange cover 104 can include a mounting plate 302 having a flat or substantially flat mating surface. The mounting plate 302 can also include multiple mounting apertures 304 for receiving a coupling device (e.g., screw, bolt, pin, rivet, etc.) therethrough. For example, the mounting apertures 304 can be positioned adjacent to the four corners of the mounting plate 302.

The pump housing 102 can include a mating surface configured to mate or abut at least a portion of the mounting plate 302. The pump housing mating surface can have a flat or substantially flat mating surface that the mating surface of the mounting plate 302 abuts and corresponding apertures for receiving the coupling devices that are positioned through the mounting apertures 304 of the mounting plate 302 to couple the mounting plate 302 to the pump housing 102. The corresponding apertures can be threaded or unthreaded. A gasket 122 or other type of sealing material can be positioned between the mating surfaces of the pump housing 102 and the housing flange cover 104 to create an improved seal when the housing flange cover 104 is coupled to the pump housing 102 via the coupling devices.

The vacuum pump 100 can also include a base 106 disposed along a bottom side of the pump housing 102. The base 106 can include one or more feet for resting the base 106 along a surface. For example, two or four feet can be provided. The feet can be individually fixed or adjustable with respect to the base 106. For example, each of the feet can be rotatably or otherwise adjustable to adjust the distance between the bottom of the foot and the bottom surface of the base 106. In this way, the angle and height of the pump 100 can be adjusted. For example, in embodiments having four feet, two positioned closer to the rear end of the pump housing 102 and two positioned closer to the front end of the pump housing 102, the rear feet may be adjusted to increase the distance between the bottom of the rear feet and the bottom surface of the base 106, which raises the rear end of the pump housing 102 with respect to the front end of the pump housing and can improve drainage of the pump oil through the oil drain port positioned along the front end of the pump 100, as described below.

The vacuum pump 100 can also include a handle 108. In one example, the handle 108 can be attached to and extend above the pump housing 102. Alternatively, the handle 108 can be positioned along any other portion of the pump housing 102 and/or the housing flange cover 104. In certain example embodiments, the handle 108 can include a vertically or substantially vertically extending first member having a first end and a distal second end. The first end can be coupled to and extend vertically or substantially vertically upward from the pump housing 102. The handle 108 can also include a horizontally or substantially horizontally extending second member extending from the second end of the first member in a horizontal or substantially horizontal direction that is orthogonal or substantially orthogonal to the first member.

The pump 100 can also include an electrical housing and switch assembly 110 operably coupled to a motor 202. The electrical housing and switch assembly 110 can include a switch for turning on and off the pump 100 and providing electrical power to the motor 202. The switch assembly 110 can include any one or more of a manually adjustable switch, a touchpad, or a remotely activated switch to turn the motor 202 on and off. The vacuum pump 100 can also include one or more inlets 124, 126. Each inlet 124, 126 can be configured to be attached to a hose (not shown) for generating a vacuum in an HVAC or other system. In one example, the inlets 124, 126 can be positioned along a top side of the pump housing 102 near the mating surface with the housing flange cover 104. Alternatively, the inlets can be positioned anywhere else along the exterior of the pump 100.

Each inlet 124, 126 can include a means for attaching the hose to the inlet 124, 126. The attachment means can include a threaded outer or inner surface, or a quick coupler/quick disconnect hose fitting. The vacuum pump 100 can also include a manually adjustable valve 122. The manual valve 122 can include an adjustable handle rotatably coupled to a pipe segment for opening and closing a passageway in the pipe segment that is in fluid communication with each of the inlets 124, 126 and positioned fluidicly between each of the inlets 124, 126 and the internal fluid path of the pump 100.

The vacuum pump 100 can also include a motor 202 disposed with one or both of the pump housing 102 and/or the housing flange cover 104. The motor 202 can be electrically coupled to a source of electrical energy via the switch assembly 110. In one example, the motor is an electric motor 202. For example, the motor 202 can be any type alternating current (A/C) or direct current (D/C) motor.

The vacuum pump 100 can also include a drive shaft 204 having a first end operably coupled to the motor 202 and a distal second end coupled to an impeller 206 or other device for creating a vacuum. The vacuum pump 100 can also include an oil inlet (not shown) fluidly coupled to an oil reservoir 212 disposed under the housing flange cover 104. The oil reservoir 212 can provide a volume for receiving and holding oil used by the vacuum pump 100 during operation.

The housing flange cover 104 can include a bottom exterior surface 130, a top exterior surface 132, one or more side exterior surfaces 136 (e.g., two side exterior surfaces), and a front exterior surface 134. Each of the front exterior surface 134 and side exterior surfaces 136 can include a top edge and a distal bottom edge. The top edge can be coupled to an edge of the top exterior surface 132 (e.g., a front edge for the top edge of the front exterior surface 134, a first side edge for the top edge of one side exterior surface 136, and a second side edge for the top edge of another side exterior surface 136). The bottom edge can be coupled to an edge of the bottom exterior surface 130 (e.g., a front edge for the bottom edge of the front exterior surface 134, a first side edge for the bottom edge of one side exterior surface 136, and a second side edge for the bottom edge of another side exterior surface 136). In this example, each of the front exterior surface 134 and side exterior surfaces 136 can extend from the bottom exterior surface 130 to the top exterior surface 132.

An exhaust port 118 can be disposed along the top exterior surface 132 of the housing flange cover 104 and can provide an opening or fluid passageway through the housing flange cover 104 from an interior of the cover 104 to an exterior of the cover 104. An exhaust fitting 120 can be removably coupled to the exhaust port 118 and can be operable to provide a path through which exhaust can exit the vacuum pump 100.

A sight glass 116 can be disposed, for example, along the front exterior surface 134 or any other exterior surface of the housing flange cover 104. In one example, the sight glass 116 is a glass or plastic window that can be used to determine the oil level within the pump 100 and/or the pump reservoir 212.

The front exterior surface 134 can extend vertically or substantially vertically and at a orthogonal or substantially orthogonal angle to the flat horizontal surface 216. In certain example embodiments, the front exterior surface 134 of the housing flange cover 104 can also include an oil drain port 112 positioned at or adjacent a bottom edge of the front exterior surface 134 at or adjacent the convergence of the front exterior surface 134 and the bottom exterior surface 130. In other example embodiments, the oil drain port 112 can be positioned along one of the side exterior surfaces 136 at or adjacent the convergence of the side exterior surface 136 and the bottom exterior surface 130. Positioning the oil drain port 112 along the front end of the pump 100 improves access to the oil drain port 112 by a user to drain the oil. The oil drain port 112 can be an opening or passageway that provides a fluid passageway through the housing flange cover 104 and is fluidicly coupled to the reservoir 212 via a drain passageway 208. In one example, oil within the vacuum pump 100 can drain from the reservoir 212 along all or a portion of the drain passageway 208 and out of the oil drain port 112.

The drain passageway 208 can have a bottom interior surface 210. All or a portion of the bottom interior surface 210 can be angled downwardly at an angle Θ with respect to a flat horizontal surface 216. The angle Θ can be an acute angle. In one example, the angle Θ of the downwardly sloping bottom interior surface 210 can be between substantially 0.1 degrees and substantially 89 degrees and more particularly between substantially 0.1 degrees and substantially 60 degrees and even more particularly between substantially 0.1 degrees and substantially 45 degrees and even more particularly between substantially 1 degree and substantially 40 degrees and even more particularly between substantially 1 degree and substantially 35 degrees and even more particularly between substantially 5 degrees and substantially 30 degrees. The downwardly angled portion of the bottom interior surface can extend to the front edge of the bottom exterior surface 130 and/or to the oil drain port 112.

The bottom interior surface 210 can be smooth or substantially smooth (e.g., no ridges, bumps, etc.). By providing a downwardly angled bottom interior surface 210 and an oil drain port 112 along the bottom edge of the front exterior surface 134 or side exterior surface 136 at or adjacent to the junction of the front exterior surface 134 or side exterior surface 136 and the bottom exterior surface 130, the sump or lowest point for the collection of oil is positioned next to or as part of the oil drain port 112. This positioning of the sump means that oil will more easily drain out of the oil drain port 112 due to normal gravity feed. This positioning of the sump also means that any sediments in the oil are also likely to collect at the lowest point near the oil drain port 112, allowing for better draining of the oil from the pump 100 and the increased likelihood that any sediment will also exit the pump via the oil drain port 112 because the initial flow of oil out of the drain port 112 will push the sediment through the oil drain port 112 and out of the reservoir 212.

In one example, the bottom exterior surface 130 of the housing flange cover 104 is also downward sloping with respect to a flat horizontal surface 216. In one example, the bottom exterior surface 130 of the housing flange cover 104 can have the same or substantially the same angle Θ (e.g., an acute angle to the flat horizontal surface 216) as that of the bottom interior surface 210 of the drain passageway 208. In certain example embodiments, the angle between the bottom exterior surface 130 and the front exterior surface 134 is less than 90 degrees and more preferably between substantially 85 degrees and substantially 60 degrees due to the downward angle of the bottom exterior surface 130.

The oil drain port 112 may be threaded in certain example embodiments in order to threadably receive a correspondingly threaded drain plug 114 that can be removably/threadably coupled to the oil drain port 112. In other example embodiments, the oil drain port 112 may be dimensioned to receive a correspondingly shaped drain plug 114 that is removably coupled to the oil drain port 112 via a friction fit or via the elasticity of all or a portion of the drain plug 114.

Figure 4:
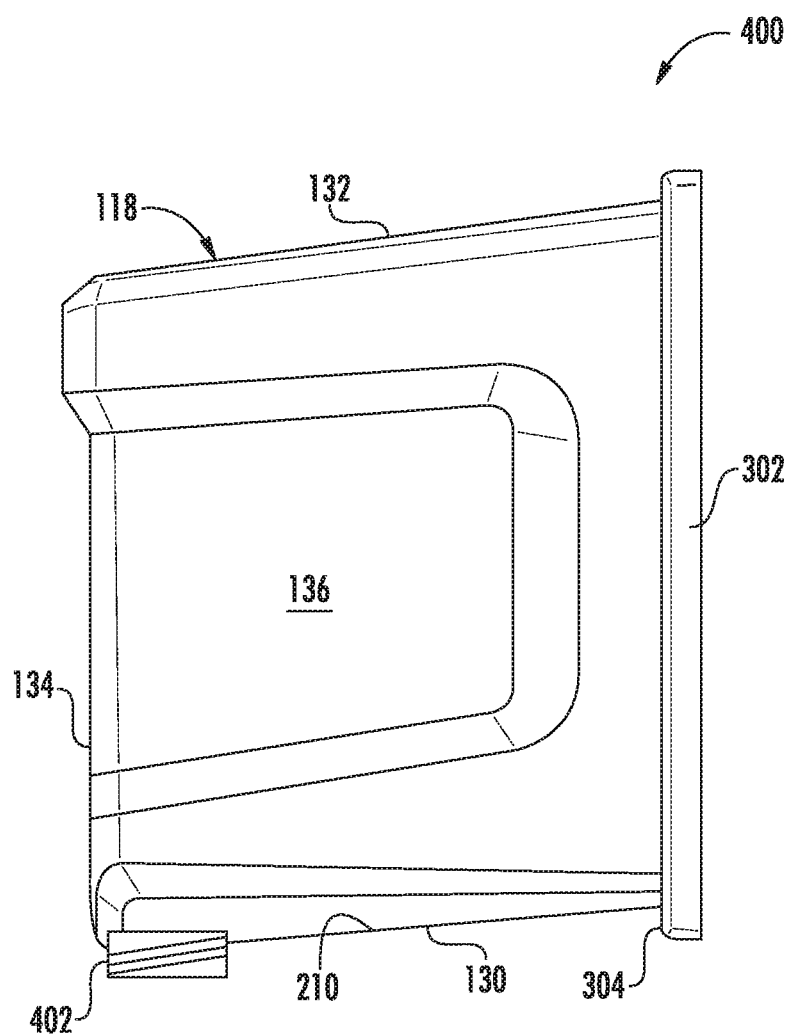
FIG. 4 is an elevation view of another example of a housing flange cover for the vacuum pump of FIG. 1 in accordance with another example embodiment of the disclosure.

FIG. 4 is an elevation view of another example of a housing flange cover 400 for the vacuum pump 100, in accordance with another example embodiment of the disclosure. The elements of the housing flange cover 400 are substantially the same as those of the housing flange cover 104 except as described below and that description of the housing flange cover 104 for all other elements is incorporated herein. Further, the housing flange cover 400 can be used with the vacuum pump 100 and the other elements of the vacuum pump, including mating with the vacuum pump housing 102 in the same manner as the housing flange cover 104.

Figure 2:
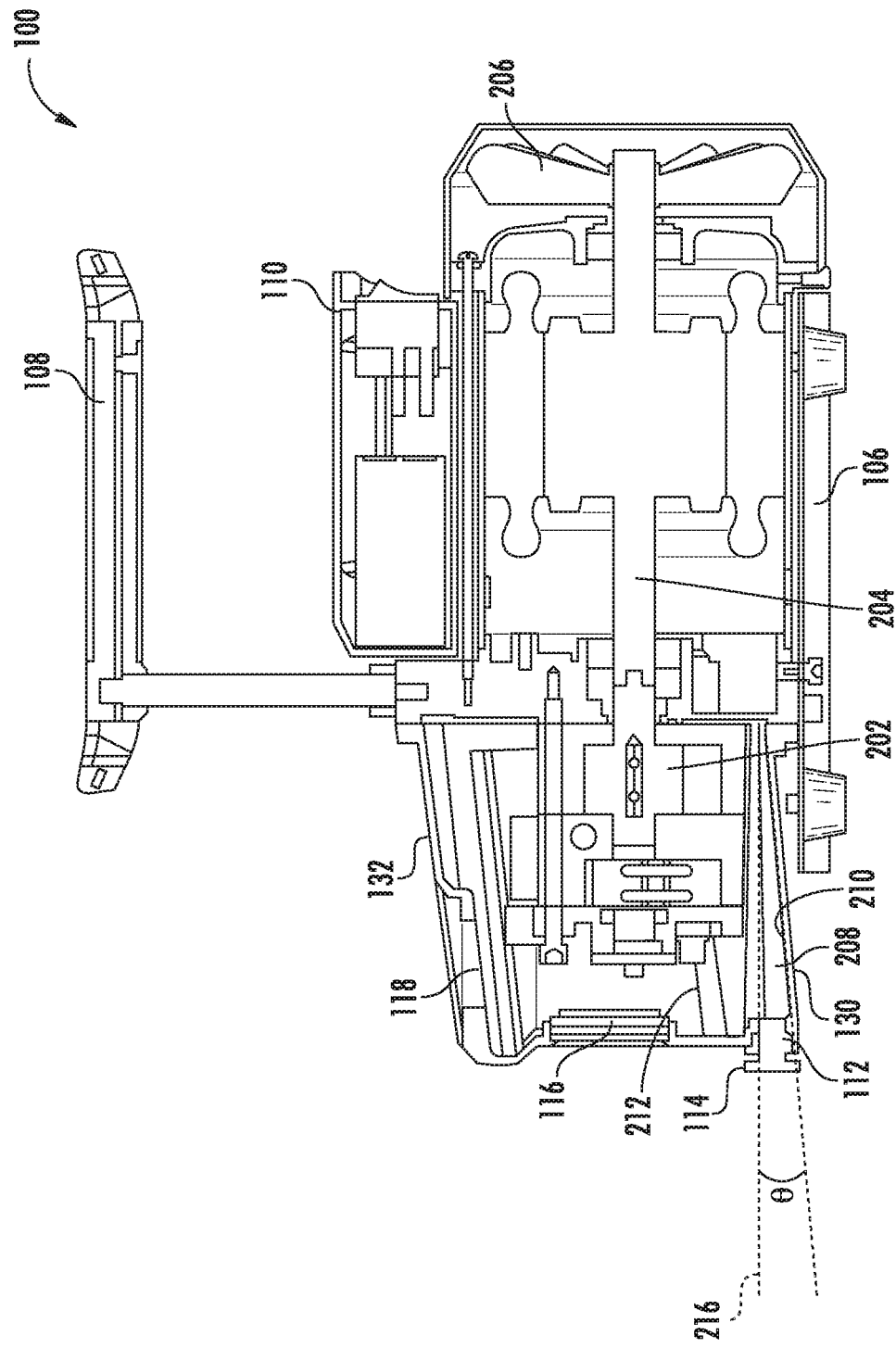
FIG. 2 is a partial sectional view of the vacuum pump of FIG. 1 in accordance with one example embodiment of the disclosure.
Figure 3A:
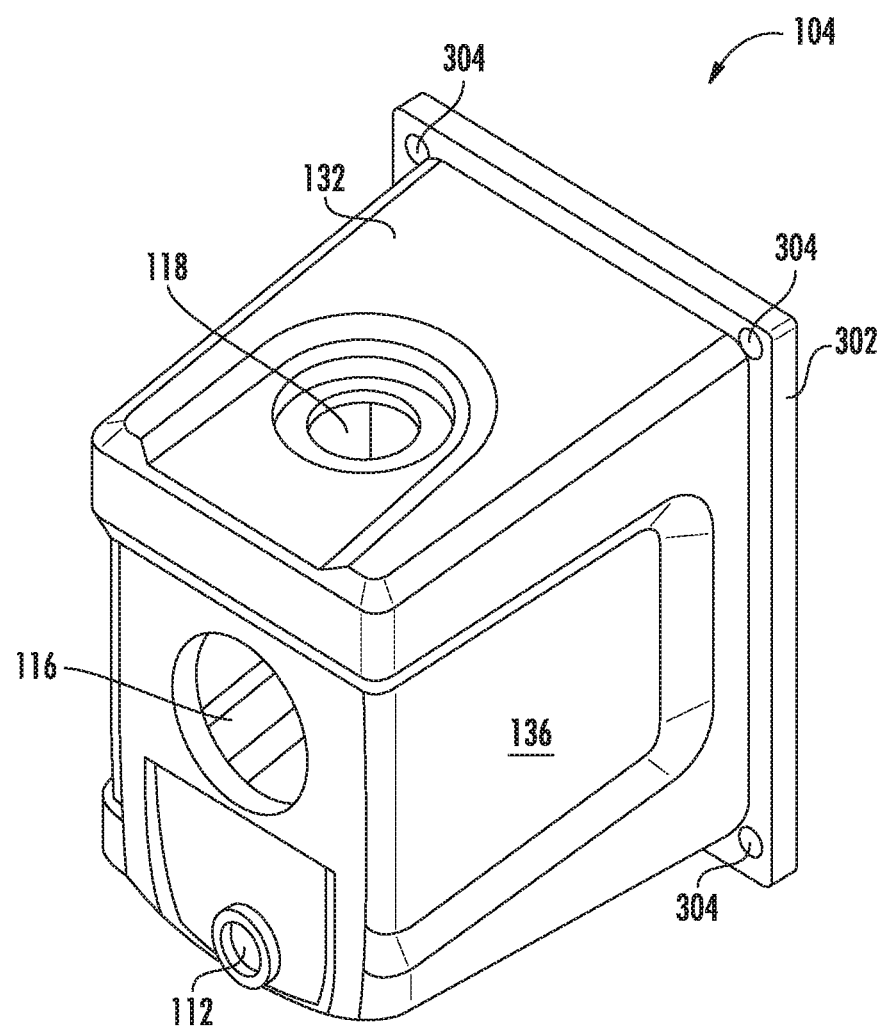
FIGS. 3A-B are perspective and elevation views of a housing flange cover for the vacuum pump of FIG. 1 in accordance with one example embodiment of the disclosure.
Figure 3B:
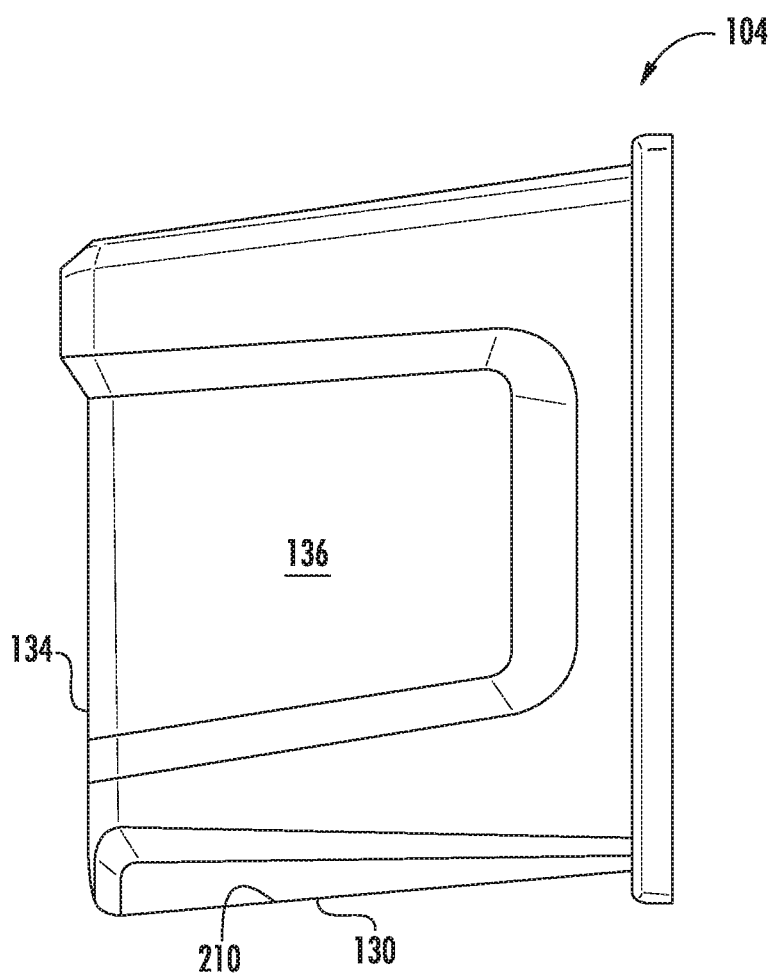

The positioning of the oil drain port 402 can be different in the housing flange cover 400 as compared to the positioning of the oil drain port 112 (see FIG. 3A) for the housing flange cover 104 of FIGS. 1-3B. Referring to FIGS. 1, 2, and 4, the bottom exterior surface 130 of the housing flange cover 400 can include an oil drain port 402 that is an opening or passageway through the housing flange cover 400 from an interior of the cover 400 to an exterior of the cover 400 and that is fluidicly coupled to the reservoir 212 (see FIG. 2) via the drain passageway 208 (see FIG. 2). The oil drain port 402 can be positioned near the front edge of the bottom exterior surface 130 at or adjacent to the where the front exterior surface 134 and the bottom exterior surface 130 meet. The positioning of the oil drain port 402 along the bottom exterior surface 130 and at or adjacent the lowest point of the bottom interior surface 210 of the drain passageway 208 further allows gravity to assist in draining oil and sediment from the pump 100. The housing flange cover 400 can also include a drain plug 114 substantially the same as that described with reference to FIGS. 1-3B.

Figure 5:
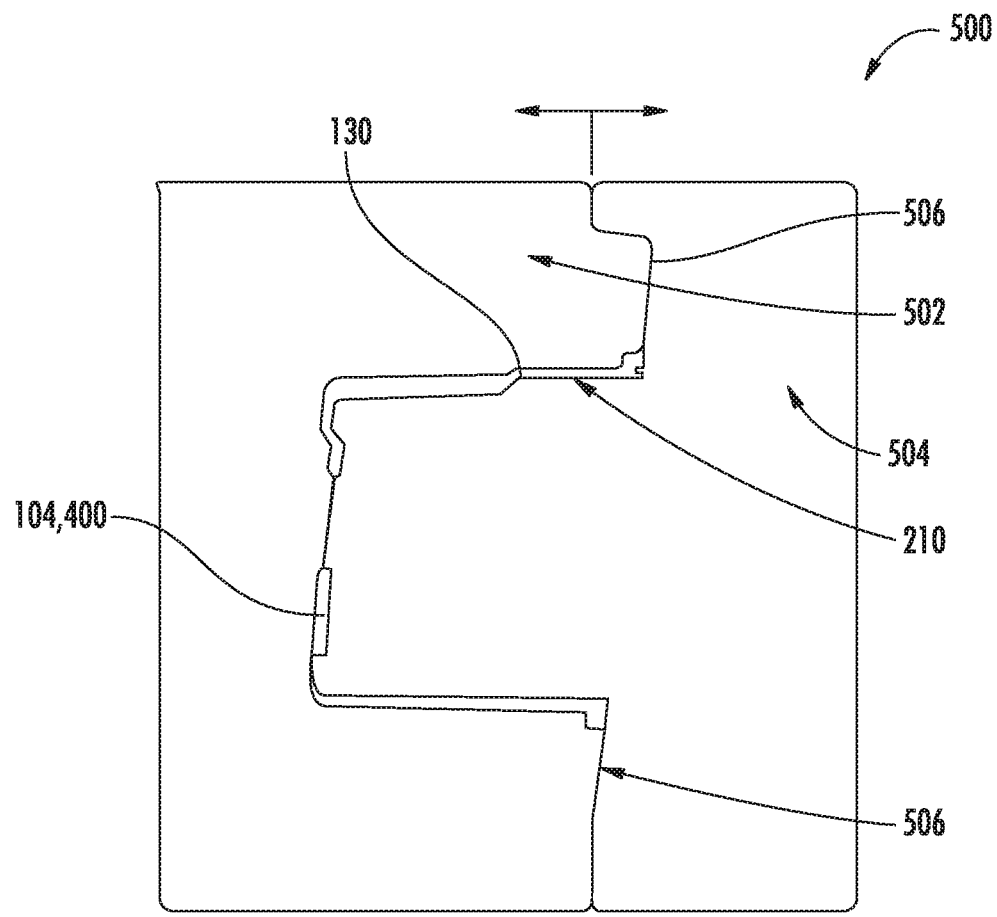
FIG. 5 is a cross-sectional view of an example casting method for the housing flange covers of FIGS. 3A-4 in accordance with one example embodiment of the disclosure.

The example housing flange cover 104, 400 can be made from metal, plastic, composite, or any other material. In one example, the housing flange cover 104, 400 is made by casting the part in a mold, however, other techniques for creating the housing flange cover 104, 400 are also contemplated. In one example, as shown in FIG. 5, a method for casting the housing flange cover 104, 400 is shown. The example method includes die casting the housing flange cover 104, 400 however, as discussed above, other techniques can be alternatively used. The mold 500 includes a mold cavity 502 and a mold cover 504 that is removable from the mold cavity 502 along the parting lines 506. The housing flange cover 104, 400 can be cast between the mold cavity 502 and the mold cover 504. Once cooled, the housing flange cover 104, 400 can be removed from the mold cavity 502. In the example embodiment, the housing flange cover 104, 400 has a bottom exterior surface 130 that is angled at the angle Θ (e.g., an acute angle) with respect to the flat horizontal surface 216 (see FIG. 2). Typically, this angle of the bottom exterior surface 130 would prevent the housing flange cover 104, 400 from being removed from the mold cavity 502 when the mold 500 is opened because the bottom surface 130 would create too much contact with the side surface of the mold cavity 502. In this example, the parting lines 506 are angled to allow for the housing flange cover 104, 400 to be removed from the mold cavity 502. In one example, the parting lines are angled the same amount of angle as the angle Θ of the bottom exterior surface 130 of the housing flange cover 104, 400. This allows the bottom exterior surface 130 to be vertically disposed with respect to the side surface of the mold cavity and allows removal of the housing flange cover 104, 400 from the mold cavity 502.

While the example embodiment has been shown and described with reference to a separate pump housing 102 and housing flange cover 104, 400, in alternative embodiments one single, unitary housing may be provided that incorporates the downwardly angled bottom interior surface 210 and bottom exterior surface of the drain passageway along with the positioning of the drain port 112, 402 as described herein. Alternatively more than two pieces of housing may be used and coupled to one-another to form the housing flange cover 104, 400 described above. Though the disclosed example includes a particular arrangement of a number of parts, components, features, and aspects, the disclosure is not limited to only that example or arrangement. Any one or more of the parts, components, features, and aspects of the disclosure can be employed alone or in other arrangements of any two or more of the same.

Although pump features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A vacuum pump comprising:
   a pump housing;
   an oil reservoir containing an oil;
   an impeller housed within the pump housing;
   a housing cover flange coupled to the pump housing, the housing cover flange comprising:
     a bottom exterior surface;
     a top exterior surface;
     a first exterior surface coupled at a first end to the bottom exterior surface and at a distal second end to the top exterior surface;
     an oil drain port extending through the housing cover flange and disposed adjacent an intersection of the first exterior surface and the bottom exterior surface;
     a bottom interior surface defining at least a portion of a drain passageway fluidicly coupled to the oil reservoir, wherein at least a portion of the bottom interior surface extends at a downward angle with respect to a horizontal towards the oil drain port away from the impeller toward the first exterior surface, wherein the portion of the bottom interior surface is positioned underneath the oil reservoir and upstream of the oil drain port such that the oil can gravitationally flow from the oil reservoir to the oil drain port via the portion of the bottom interior surface, wherein the portion of the bottom interior surface is enclosed via the housing cover flange; and
   a handle attached to and extending above the pump housing.

2. The vacuum pump of claim 1, wherein the oil drain port is disposed through the first exterior surface of the housing cover flange.

3. The vacuum pump of claim 2, wherein the first exterior surface extends in a substantially vertical direction from the bottom exterior surface to the top exterior surface.

4. The vacuum pump of claim 3, wherein the first exterior surface is a front exterior surface.

5. The vacuum pump of claim 1, wherein the oil drain port is disposed through the bottom exterior surface of the housing cover flange.

6. The vacuum pump of claim 1, wherein the downward angle is an acute angle with respect to the horizontal.

7. The vacuum pump of claim 1, wherein the downward angle is between substantially 5 degrees and substantially 30 degrees.

8. The vacuum pump of claim 1, wherein the housing cover flange is removably coupled to the pump housing.

9. The vacuum pump of claim 1, wherein at least a portion of the bottom exterior surface extends at the downward angle with respect to the horizontal towards the oil drain port.

10. The vacuum pump of claim 1, wherein the oil drain port comprises a threaded aperture and wherein the pump further comprises a drain plug, wherein the drain plug comprises a plurality of threads configured to be threadably coupled to the oil drain port.

11. The vacuum pump of claim 1, wherein the handle includes a first member and a second member, wherein the first member extends vertically from the pump housing when the oil gravitationally flows from the oil reservoir to the oil drain port, wherein the second member extends horizontally from the first member when the oil gravitationally flows from the oil reservoir to the oil drain port.

12. The vacuum pump of claim 11, wherein the first member includes a proximal end portion and a distal end portion, wherein the proximal end portion extends from the pump housing, wherein the second member extends horizontally from the distal end portion.

13. The vacuum pump of claim 12, wherein the second member is orthogonal to the first member.

14. The vacuum pump of claim 11, further comprising a drive shaft coupled to the impeller, wherein the second member extends above the drive shaft when the oil gravitationally flows from the oil reservoir to the oil drain port.

15. The vacuum pump of claim 14, wherein the drive shaft extends between the impeller and the oil reservoir.

16. The vacuum pump of claim 11, wherein the second member avoids extending over the portion of the bottom interior surface that extends at the downward angle with respect to the horizontal towards the oil drain port away from the impeller toward the first exterior surface when the oil gravitationally flows from the oil reservoir to the oil drain port.

\* \* \* \* \*